(12) United States Patent
Karaoguz et al.

(10) Patent No.: US 8,830,951 B2
(45) Date of Patent: Sep. 9, 2014

(54) MULTICASTING OR BROADCASTING VIA A PLURALITY OF FEMTOCELLS

(75) Inventors: Jeyhan Karaoguz, Irvine, CA (US);
Charles Abraham, Los Gatos, CA (US);
Xuemin Sherman Chen, Rancho Santa Fe, CA (US); Wael William Diab, San Francisco, CA (US); Vinko Erceg, Cardiff, CA (US); Victor T. Hou, La Jolla, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 1046 days.

(21) Appl. No.: 12/391,009

(22) Filed: Feb. 23, 2009

(65) Prior Publication Data
US 2010/0215029 A1    Aug. 26, 2010

(51) Int. Cl.
*H04W 4/00* (2009.01)

(52) U.S. Cl.
USPC ............................ 370/331; 370/338; 370/465

(58) Field of Classification Search
USPC ......... 370/319, 320, 321, 324, 342, 344, 347, 370/350, 432, 441, 442; 455/422.1
See application file for complete search history.

(56) References Cited

U.S. PATENT DOCUMENTS

| | | | |
|---|---|---|---|
| 7,076,568 B2 * | 7/2006 | Philbrick et al. | 709/250 |
| 7,746,799 B2 * | 6/2010 | Kokot et al. | 370/252 |
| 7,877,496 B2 * | 1/2011 | Stevens et al. | 709/229 |
| 7,990,912 B2 * | 8/2011 | Nix et al. | 370/328 |
| 8,165,090 B2 * | 4/2012 | Nix | 370/331 |
| 8,165,091 B2 * | 4/2012 | Nix | 370/331 |
| 8,284,700 B2 * | 10/2012 | Viorel et al. | 370/254 |
| 8,635,645 B2 * | 1/2014 | Krishnamoorthi et al. | 725/39 |
| 2006/0209795 A1 | 9/2006 | Chow et al. | |
| 2007/0121655 A1 | 5/2007 | Jin | |
| 2008/0216145 A1 | 9/2008 | Barton et al. | |
| 2008/0244148 A1 | 10/2008 | Nix, Jr. et al. | |
| 2009/0042536 A1 | 2/2009 | Bernard et al. | |
| 2009/0061873 A1 | 3/2009 | Bao et al. | |

(Continued)

FOREIGN PATENT DOCUMENTS

WO    2007000455    1/2007

OTHER PUBLICATIONS

European Search Report corresponding to European Patent Application No. 10001341.6-1244, dated Jul. 5, 2010.
Unpublished U.S. Appl. No. 12/406,835, filed Mar. 18, 2009.

(Continued)

*Primary Examiner* — Brian O'Connor
(74) *Attorney, Agent, or Firm* — Sterne, Kessler, Goldstein & Fox P.L.L.C.

(57) ABSTRACT

Aspects of a method and system for servicing a plurality of users via a plurality of femtocells are provided. In this regard, a cellular enabled communication device may receive portions of a datastream from a plurality of femtocells, reconstruct the datastream from the received portions of the datastream, and process the reconstructed datastream for presentation to a user of the cellular enabled communication device. The received portions may be buffered in the cellular enabled communication device. The portions of the datastream may be associated with a plurality of CDMA channel access codes. The portions of the datastream may be received via a plurality of cellular frequencies. The portions of the datastream may be received during a plurality of TDMA timeslots. Portions of the datastream may be received from a cellular base station. Portions of the datastream may be received from a WiMAX base station.

20 Claims, 7 Drawing Sheets

(56) References Cited

U.S. PATENT DOCUMENTS

| | | | |
|---|---|---|---|
| 2009/0092081 A1 | 4/2009 | Balasubramanian et al. | |
| 2009/0098858 A1 | 4/2009 | Gogic | |
| 2009/0164547 A1 | 6/2009 | Ch'ng | |
| 2009/0215452 A1* | 8/2009 | Balasubramanian et al. | 455/434 |
| 2009/0225743 A1* | 9/2009 | Nicholls et al. | 370/350 |
| 2009/0257361 A1* | 10/2009 | Deshpande et al. | 370/252 |
| 2009/0279430 A1 | 11/2009 | Huber et al. | |
| 2009/0288144 A1 | 11/2009 | Huber et al. | |
| 2009/0292799 A1 | 11/2009 | Eisener et al. | |
| 2009/0299788 A1* | 12/2009 | Huber et al. | 705/7 |
| 2009/0316649 A1 | 12/2009 | Chen | |
| 2010/0027469 A1* | 2/2010 | Gurajala et al. | 370/328 |
| 2010/0027521 A1* | 2/2010 | Huber et al. | 370/338 |
| 2010/0041364 A1* | 2/2010 | Lott et al. | 455/404.1 |
| 2010/0080163 A1* | 4/2010 | Krishnamoorthi et al. | 370/312 |
| 2010/0112982 A1* | 5/2010 | Singh et al. | 455/411 |
| 2010/0167734 A1 | 7/2010 | Jones et al. | |
| 2010/0172267 A1* | 7/2010 | Viorel et al. | 370/254 |
| 2010/0182991 A1 | 7/2010 | Abraham et al. | |
| 2010/0184411 A1 | 7/2010 | Chen et al. | |
| 2010/0184414 A1 | 7/2010 | Abraham et al. | |
| 2010/0184423 A1 | 7/2010 | Kent et al. | |
| 2010/0184450 A1 | 7/2010 | Chen et al. | |
| 2010/0186027 A1 | 7/2010 | Hou et al. | |
| 2010/0210239 A1 | 8/2010 | Karaoguz et al. | |
| 2010/0220642 A1 | 9/2010 | Abraham et al. | |
| 2010/0220692 A1 | 9/2010 | Diab et al. | |
| 2010/0220731 A1 | 9/2010 | Diab et al. | |
| 2010/0222054 A1 | 9/2010 | Abraham et al. | |
| 2010/0222069 A1 | 9/2010 | Abraham et al. | |
| 2010/0238836 A1 | 9/2010 | Diab et al. | |

OTHER PUBLICATIONS

Unpublished U.S. Appl. No. 12/395,470, filed Feb. 27, 2009.
Unpublished U.S. Appl. No. 12/395,410, filed Feb. 27, 2009.
Unpublished U.S. Appl. No. 12/395,383, filed Feb. 27, 2009.
Unpublished U.S. Appl. No. 12/395,313, filed Feb. 27, 2009.
Unpublished U.S. Appl. No. 12/395,436, filed Feb. 27, 2009.

* cited by examiner

MULTICASTING OR BROADCASTING VIA A PLURALITY OF FEMTOCELLS

CROSS-REFERENCE TO RELATED APPLICATIONS/INCORPORATION BY REFERENCE

Not applicable.

FIELD OF THE INVENTION

Certain embodiments of the invention relate to communications. More specifically, certain embodiments of the invention relate to a method and system for multicasting or broadcasting via a plurality of users via a plurality of femtocells.

BACKGROUND OF THE INVENTION

A femtocell may be placed in a customer's residence or in a small business environment, for example. Femtocells may be utilized for off-loading macro radio network traffic, improving coverage locally in a cost-effective manner, and/or implementing home-zone services to increase revenue. Femtocells, like macro cell base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data traffic, for example.

An important characteristic of femtocells is their ability to control access. In an open access scenario, any terminal and/or subscriber may be allowed to communicate with the femtocell. Accordingly, the femtocell usage may somewhat resemble that of a macrocell system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocell base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocell networks or due to the proximity of femtocell base stations in dense urban areas.

There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for multicasting or broadcasting via a plurality of users via a plurality of femtocells, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for multicasting or broadcasting via a plurality of users via a plurality of femtocells. In various exemplary embodiments of the invention, a cellular enabled communication device may receive portions of a datastream from a plurality of femtocells, reconstruct the received portions of the datastream, and process the reconstructed received portions of the datastream for presentation to a user of the cellular enabled communication device. The cellular enabled communication device and the plurality of femtocells may be synchronized via, for example, received signals from a global navigation satellite system. The received portions may be buffered in the cellular enabled communication device. The buffered received portions of the datastream that are out-of-order may be reordered. The portions of the datastream may be associated with a plurality of CDMA channel access codes and may be received via a plurality of cellular frequencies. The portions of the datastream may be received during a plurality of TDMA timeslots. In various embodiments of the invention, some portions of the datastream may be received from a cellular base station and/or from a WiMAX base station.

Figure 1A:
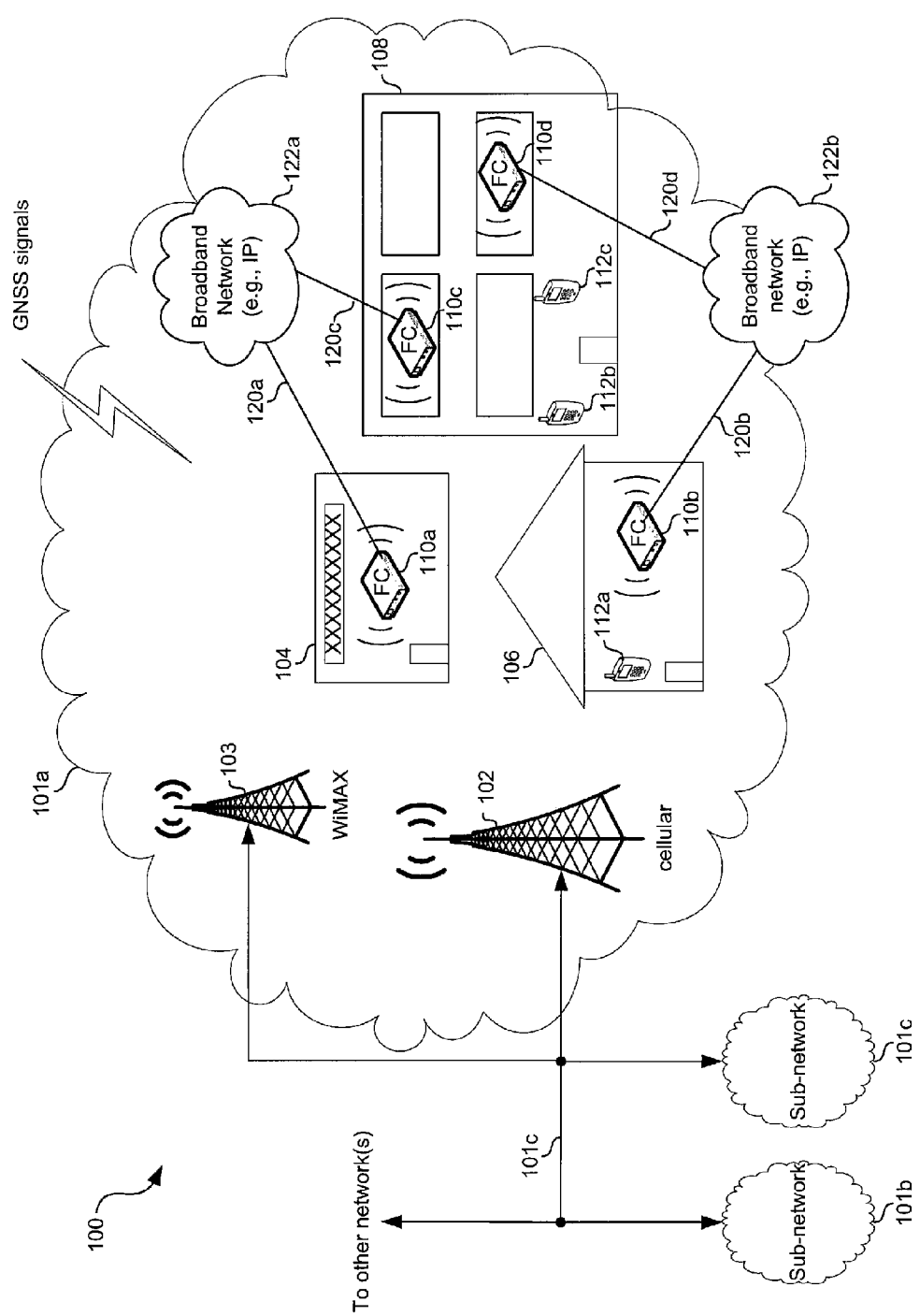
FIG. 1A is a diagram illustrating an exemplary cellular network, in accordance with an embodiment of the invention.

FIG. 1A is a diagram illustrating an exemplary cellular network, in accordance with an embodiment of the invention. Referring to FIG. 1A, there is shown a cellular network 100 comprising sub-networks 101a-101c. The exemplary sub-network 101a may comprise a cellular base station 102, a WiMAX base station 103, femtocells 110a-110d, which are collectively referred to herein as femtocells 110, and cellular enabled communication devices 112a-112c, which are collectively referred to herein as cellular enabled communication devices 112. The femtocells 110 may be installed in one or more commercial properties 104, one or more residential properties 106, and/or one or more multi-tenant properties 108.

The networks 122a and 122b, collectively referred to herein as networks 122, may comprise, for example, satellite networks, cable networks, DVB networks, the Internet, or similar local or wide area networks, which are capable of conveying data which may comprise multimedia. The broadband connections 120a-120d, collectively referred to herein as connections 120, may comprise optical, wired, and/or wireless links.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The cellular base station 102 may be operable to communicate data wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The cellular base station 102 may communicate with cellular enabled communication devices such as the cellular enabled communication devices 112. Exemplary cellular standards supported by the cellular base station 102 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). The cellular base station 102 may communicate data amongst the various components of the sub-network 101a. Additionally, data communicated to and/or from the cellular base station 102 may be communicated to sub-network 101b, sub-network 101c, and/or to one or more other networks (not shown) via one or more backhaul links 103. In this manner, data communicated to and/or from the cellular base station 102 may be communicated to and/or from, other portions of the network 100 and/or other networks. Exemplary networks with which data may be communicated may comprise public switched telephone networks (PSTN) and/or IP networks such as the Internet or an intranet.

The WiMAX base station 103 may be operable to communicate data wirelessly in accordance with WiMAX standards and/or protocols. The protocols utilized by the WiMAX base station 103 may be based on the IEEE 802.16 standard, developed or maintained by the WiMAX (IEEE 802.16) forum, and/or may also comprise proprietary protocols.

The femtocells 110 may each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). Additionally, the femtocells 110 may each comprise suitable logic, circuitry, and/or code that may be operable to communicate over an IP network (not shown in FIG. 1A). In various embodiments of the invention the femtocells 110, the sub-network 101c, and/or the network 100 may be managed by a service provider which licenses the cellular frequencies utilized.

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication device may comprise laptop computers, mobile phones, and personal media players. The cellular enabled communication devices 112 may be enabled to receive, process, and present multimedia content and may additionally be enabled run a web browser or other applications for providing Internet services to a user of the cellular enabled communication device 112. In various embodiments of the invention, the cellular enabled communication devices 112 may be operable to communicate simultaneously with a plurality of femtocells. In this regard, the cellular enabled communication devices 112 may be operable to receive a portion of a multicast or broadcast stream from each of two or more femtocells, and process the received stream for presentation to a user.

In operation, two or more femtocells may be utilized to multicast and/or broadcast data to one or more cellular enabled communication devices. One of the cellular enabled communication devices 112 may be operable to receive packets of, for example, a multimedia stream from a plurality of femtocells and may process the packets for presenting the multimedia content to a user of the cellular enabled communication device. For example, the femtocells 110c and 110d may multicast a multimedia stream to the cellular enabled communication devices 112b and 112c which may receive, process, and present the multimedia stream via a display and/or speaker of the cellular enabled communication devices 112b and 112c. In this regard, the cellular enabled communication devices 112b and 112c may be operable to receive portions of the multimedia stream from each of the femtocells 110c and 110d. For reliable and timely presentation of the multimedia content, the cellular enabled communication devices 112b and 112c and the femtocells 110c and 110d may be synchronized. The femtocells and the cellular enabled communication device may be synchronized via, for example, time maintained by a global navigation satellite system (GNSS).

In an exemplary embodiment of the invention, the multicast and/or broadcast data may be transmitted utilizing excess bandwidth in the femtocells. In this regard, although a femtocell may primarily support unicast communications with cellular enabled communication devices in its service area, there may be instances when the femtocell has excess bandwidth that is not needed to support the unicast traffic. In such instances, the excess bandwidth may be utilized to transmit all or a portion of a multicast and/or broadcast datastream.

In various exemplary embodiments of the invention, the femtocells 110c and 110d may insert packet identifiers, timestamps, and/or other identifying information into the portions of the datastream that they transmit. In this manner, a cellular enabled communication device receiving the portion of the datastream may be enabled to identify the datastream and/or the femtocell that transmitted it.

In various exemplary embodiments of the invention, cellular enabled communication devices may be operable to receive portions of a datastream from one or more femtocells and other portions of the datastream from one or more macrocells such as the cellular base station 102. In various exemplary embodiments of the invention, cellular enabled communication devices may be operable to receive portions of a datastream from one or more femtocells and other portions of the datastream from one or more WiMAX base stations such as the cellular base station 103.

Figure 1B:
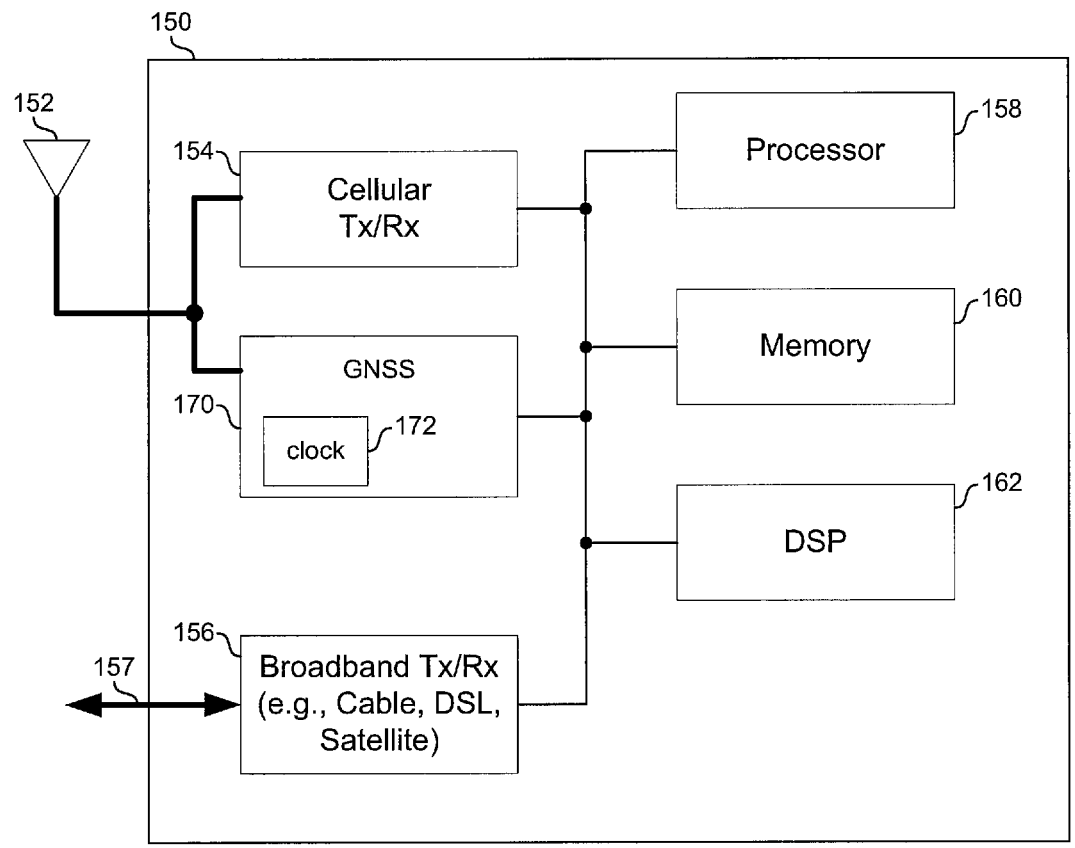
FIG. 1B is a block diagram of an exemplary femtocell, in accordance with an embodiment of the invention.

FIG. 1B is a block diagram of an exemplary femtocell, in accordance with an embodiment of the invention. Referring to FIG. 1B the femtocell 150 may comprise an antenna 152, a global navigation satellite system (GNSS) receiver (Rx) 170, a cellular transmitter and/or receiver (Tx/Rx) 154, a broadband transmitter and/or receiver (Tx/Rx) 156, a processor 158, a memory 160, a digital signal processor (DSP) 162, an multimedia interface 164, and an input and/or output (I/O) interface 166.

The antenna 152 may be suitable for transmitting and/or receiving cellular signals. Although a single antenna is illustrated, the invention is not so limited. In this regard, the cellular Tx/Rx 154 may utilize a common antenna for transmission and reception, may utilize different antennas for transmission and reception, and/or may utilize a plurality of antennas for transmission and/or reception. Similarly, the cellular Tx/Rx 154 and the GNSS Rx 170 may share an antenna or may utilize different antennas.

The GNSS Rx 170 may comprise suitable logic, circuitry, and/or code that may be operable to receive and process signals from a GNSS system. Exemplary GNSS systems comprise the United State's global positioning system (GPS), Russia's GLONASS, and the European Union's Galileo. The GNSS Rx 170 may comprise a clock 172 and may be operable to maintain the accuracy of the clock 172 based on received GNSS signals. In various embodiments of the invention, the clock 172 may be utilized to synchronize and/or maintain operations of other portions of the IFSTB device 150. For example, content may be transmitted, decoded and/or presented based on the clock 172.

The cellular Tx/Rx 154 may comprise suitable logic circuitry and/or code that may be operable to transmit and/or receive data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. Exemplary cellular standards supported by the IFSTB device 150 may be specified in the International Mobile Telecomunnications-2000 (IMT-2000) standard and/or developed by the $3^{rd}$ generation partnership project (3GPP) and/or the $3^{rd}$ generation partnership project 2 (3GPP2).

The broadband Tx/Rx 156 may comprise suitable logic, circuitry, and/or code that may be operable to transmit data in adherence to one or more broadband standard. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. The broadband Tx/Rx 156 may transmit and/or receive data over the broadband connection 157 which may comprise, for example, a T1/E1 line, optical fiber (e.g., xPON), DSL, cable television infrastructure, satellite broadband internet connection, satellite television infrastructure, and/or Ethernet. The broadband connection 157 may be similar to or the same as the broadband connections 120 described with respect to FIG. 1A.

The processor 158 may comprise suitable logic, circuitry, and/or code that may enable processing data and/or controlling operations of the IFSTB device 150. In this regard, the processor 158 may be enabled to provide control signals to the various other portions comprising the IFSTB device 150. The processor 158 may also control transfers of data between various portions of the IFSTB device 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the GNSS Rx 170, cellular Tx/Rx 154, the broadband Tx/Rx 156, the DSP 162, and/or the memory 160.

The memory 160 may comprise suitable logic, circuitry, and/or code that may enable storage or programming of information comprising parameters and/or code that may effectuate the operation of the IFSTB device 150. Stored information may comprise received data and/or data to be presented, transmitted, and/or otherwise processed. The parameters may comprise configuration data and the code may comprise operational code such as software and/or firmware, but the information need not be limited in this regard.

The DSP 162 may comprise suitable logic, circuitry, and/or code operable to perform computationally intensive processing of data. In various embodiments of the invention, the DSP 162 may encode, decode, transcode, modulate, demodulate, encrypt, decrypt, scramble, descramble, and/or otherwise process data.

In operation, the femtocell 150 may be enabled to transmit portions of a datastream via the cellular Tx/Rx 154. In some embodiments of the invention, the portions of the datastream may be received via the broadband Tx/Rx 156. The received portions may be transcoded, formatted, or otherwise processed by the processor 158, the memory 160, and/or the DSP 162, and transmitted via the cellular Tx/Rx 154. In some embodiments of the invention, the complete datastream may be received via the broadband Tx/Rx 156 and the processor 158, the memory 160, and/or the DSP 162, may transcode, format, or otherwise process the datastream and convey portions of the datastream to the cellular Tx/Rx 154 for transmission.

In an exemplary embodiment of the invention, excess bandwidth of the cellular Tx/Rx 154, that is, bandwidth not necessary to support dedicated connections to one or more cellular enabled communication devices, may be utilized to multicast or broadcast the portion(s) of the datastream to a plurality of cellular enabled communication devices.

Figure 1C:
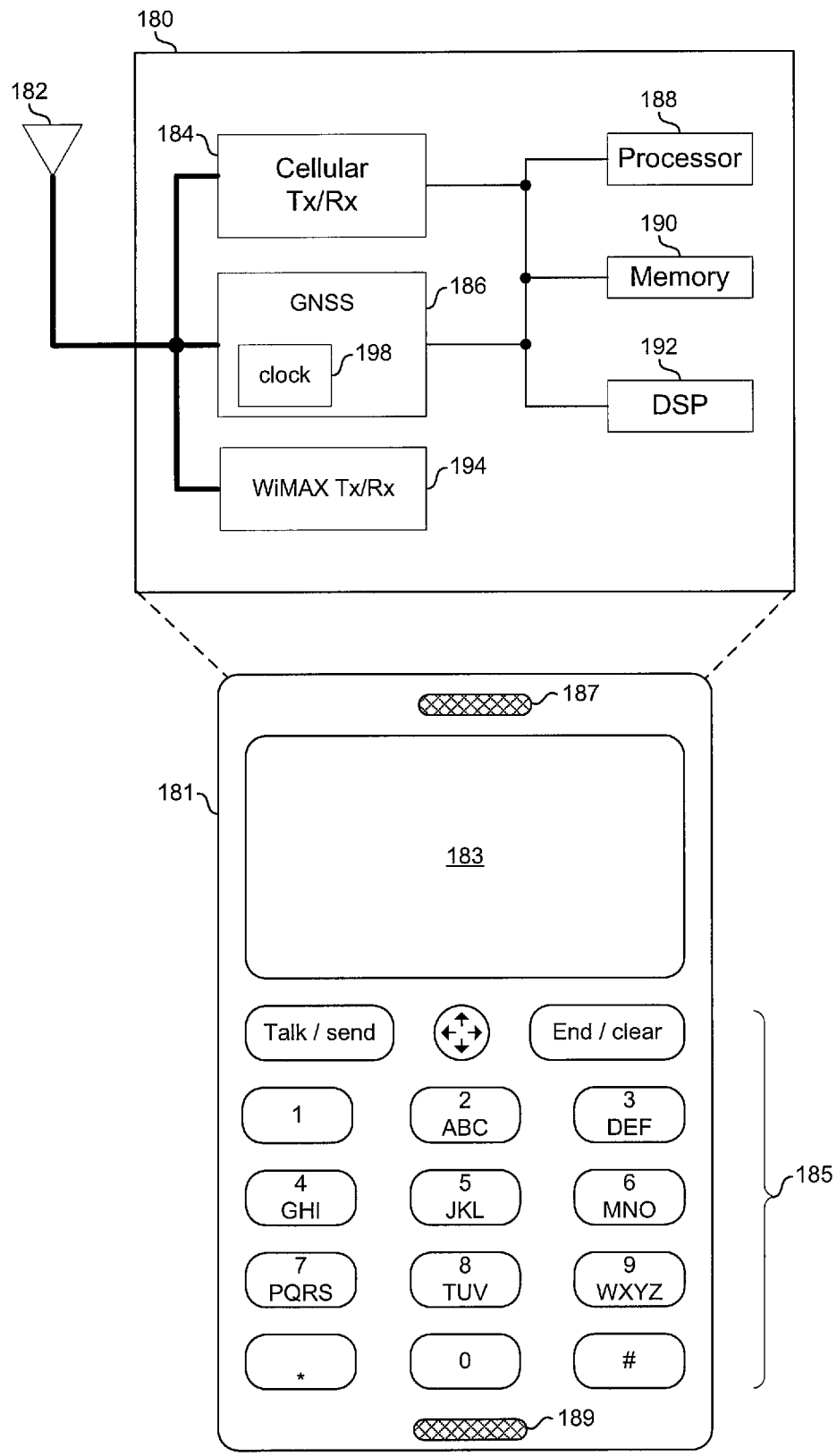
FIG. 1C is a block diagram of an exemplary cellular enabled communication device, in accordance with an embodiment of the invention.

FIG. 1C is a block diagram of an exemplary cellular enabled communication device, in accordance with an embodiment of the invention. The cellular enabled communication device 180 may comprise an antenna 182, cellular Tx/Rx 184, a GNSS Rx 186, a WiMAX Tx/Rx 194, a processor 188, a memory 190, a DSP 192, a display 183, user controls 185, a speaker 187, and a microphone 189.

The antenna 182 may be suitable for transmitting and/or receiving cellular signals. Although a single antenna is illustrated, the invention is not so limited. In this regard, the cellular Tx/Rx 184 may utilize a common antenna for transmission and reception, may utilize different antennas for transmission and reception, and/or may utilize a plurality of antennas for transmission and/or reception. Similarly, the cellular Tx/Rx 184 and the GNSS Rx 186 may share an antenna or may utilize different antennas.

The GNSS Rx 186 may comprise suitable logic, circuitry, and/or code that may be operable to receive and process signals from a GNSS system. Exemplary GNSS systems comprise the United State's global positioning system (GPS), Russia's GLONASS, and the European Union's Galileo. The GNSS Rx 186 may comprise a clock 198 and may be operable to maintain the accuracy of the clock 198 based on received GNSS signals. In various embodiments of the invention, the clock 198 may be utilized to synchronize and/or maintain operations of other portions of the IFSTB device 180. For example, content may be transmitted, decoded and/or presented based on the clock 189.

The cellular Tx/Rx 184 may comprise suitable logic circuitry and/or code that may be operable to transmit and/or receive data utilizing one or more cellular standards. The cellular Tx/Rx 184 may be operable to perform amplification, down-conversion, filtering, demodulation, and analog to digital conversion of received cellular signals. The cellular Tx/Rx 184 may be operable to perform amplification, up-conversion, filtering, modulation, and digital to analog conversion of transmitted cellular signals. Exemplary cellular standards supported by the IFSTB device 180 may be specified in the International Mobile Telecomunnications-2000 (IMT-2000) standard and/or developed by the $3^{rd}$ generation partnership project (3GPP) and/or the $3^{rd}$ generation partnership project 2 (3GPP2).

The WiMAX Tx/Rx 194 may comprise suitable logic, circuitry, and/or code that may be operable transmit and/or receive signals in accordance with WiMAX standards and/or protocols. Protocols utilized by the WiMAX Tx/Rx 194 may be based on the IEEE 802.16 standard and/or developed or maintained by the WiMAX forum.

The processor 188 may comprise suitable logic, circuitry, and/or code that may enable processing data and/or controlling operations of the IFSTB device 180. In this regard, the processor 188 may be enabled to provide control signals to the various other portions comprising the IFSTB device 180. The processor 188 may also control transfers of data between various portions of the IFSTB device 180. Additionally, the processor 188 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the GNSS Rx 186, cellular Tx/Rx 184, the DSP 192, and/or the memory 190.

The memory 190 may comprise suitable logic, circuitry, and/or code that may enable storage or programming of information comprising parameters and/or code that may effectuate the operation of the IFSTB device 180. Stored information may comprise received data and/or data to be presented, transmitted, and/or otherwise processed. In this regard, one or more received portions of one or more datastreams may be buffered in the memory 190. The parameters may comprise configuration data and the code may comprise operational code such as software and/or firmware, but the information need not be limited in this regard.

The DSP 192 may comprise suitable logic, circuitry, and/or code operable to perform computationally intensive processing of data. In various embodiments of the invention, the DSP 192 may encode, decode, transcode, modulate, demodulate, encrypt, decrypt, scramble, descramble, and/or otherwise process data.

The display 183 may be operable to provide visual information to, and/or enable interaction by, a user of the cellular enabled communication device 180. In various embodiments of the invention, a graphical user interface may be presented via the display 183. The user interface of the mobile cellular enabled communication device 180 may be utilized to select which source or sources it may have a desire to receive content from. For example, the user interface may be utilized to specify which femtocells, WiMAX base stations, and/or the cellular base stations that it may have a desire to receive the content from. Such a specification may be based on, for example, bandwidth availability, bandwidth cost, content cost, available power or battery level of the mobile cellular enabled communication device, and/or time-of-day at which the content is desired. In various embodiments of the invention, a visual media content such as video, images, and text may be presented via the display 183.

The user controls 185 may be operable to enable user interaction with the cellular enabled communication device 180 to control services and/or content handled by the cellular enabled communication device 180. The user controls 185 may comprise, for example, a keypad, a keyboard, a roller ball, a multidirectional button, a scroll wheels, and/or a touch screen.

The speaker 187 may be operable to present audio information to a user. The speaker may present voice from a phone call and/or music or ringtones played back by the cellular enabled communication device.

The microphone 189 may be operable to convert acoustic signals into electronic signals. The microphone may enable a user to participate in a phone call and/or interact with the cellular enabled communication device via oral input.

In operation, the cellular enabled communication device 180 may be operable to receive portions of a multicast or broadcast stream from any combination of one or more femtocells, a cellular base station, and/or a WiMAX base station. The cellular enabled communication device 180 may process the received stream for presentation to a user. The portions of the datastream may be received via the cellular Tx/Rx 182 and processed via one or more of the processor 188, memory 190, and DSP 192. In various embodiments of the invention, the cellular Tx/Rx 184 may be operable to utilize time division multiple access, frequency division multiple access, and/or code division multiple access to receive data from femtocells, cellular base stations, and/or WiMAX base stations.

In an exemplary embodiment of the invention, the cellular Tx/Rx 184 may receive cellular signals and output digital baseband data to the processor 188, the memory 190, and/or the DSP 192. This digital baseband data may be processed and may be reassembled with other data to generate or reconstruct a datastream; where the other data may be: received on a different frequency, associated with a different CDMA code, and/or received during different timeslots. In this manner, the datastream may be reconstructed from received portions of the datastream. The datastream may then be processed by the processor 188, the memory 190, and/or the DSP 192 to effectuate operation of the cellular enabled communication device 180 and/or for presentation of content to a user of the cellular enabled communication device 180.

Figure 2:
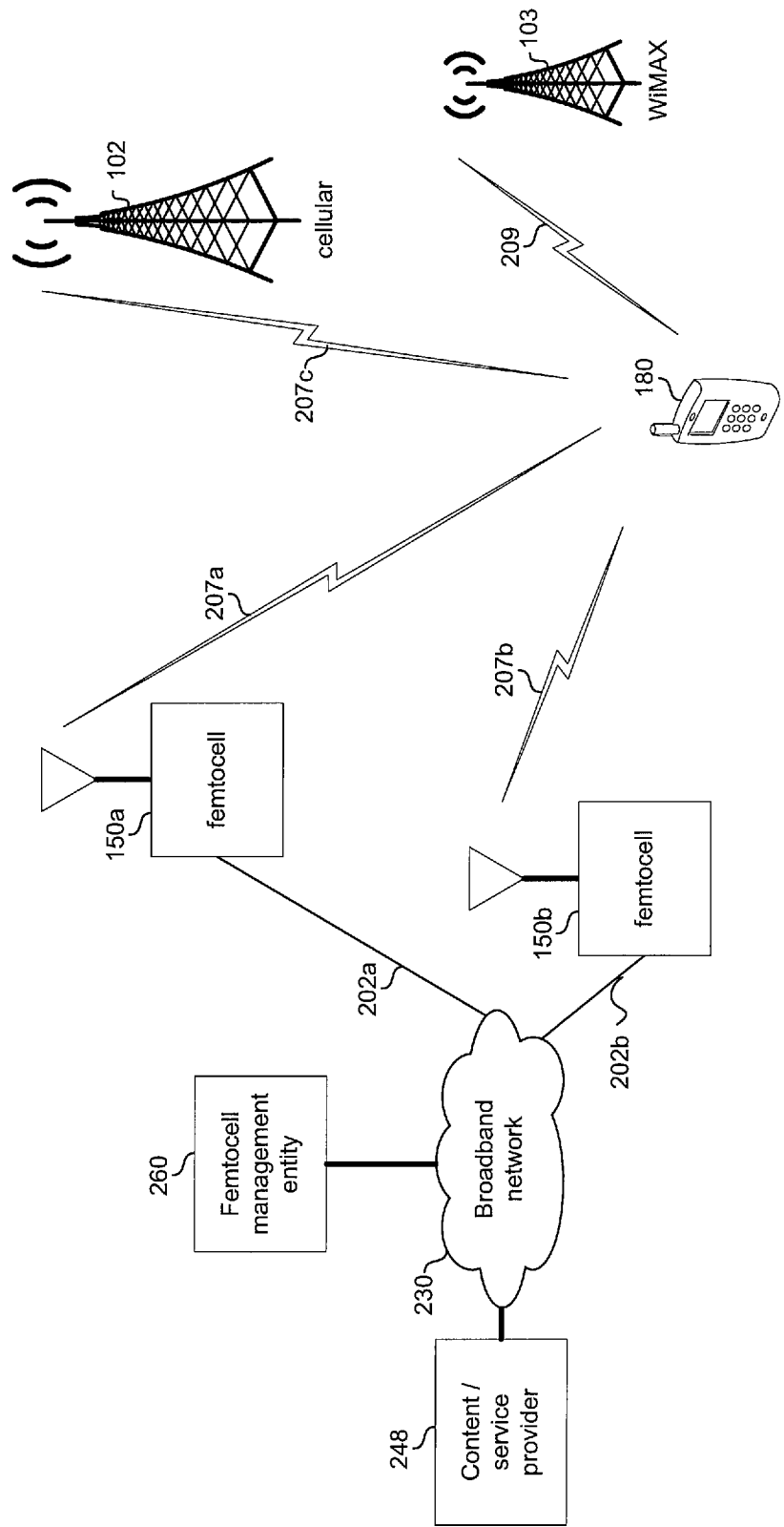
FIG. 2 is a diagram illustrating a plurality of femtocells transmitting portions of a datastream to a single cellular enabled communication device, in accordance with an embodiment of the invention.

FIG. 2 is a diagram illustrating a plurality of femtocells transmitting portions of a datastream to a single cellular enabled communication device, in accordance with an embodiment of the invention. Referring to FIG. 2, there is shown a content and/or service provider 248, a femtocell management entity 260, a broadband network 230, femtocells 150*a* and 150*b*, the cellular enabled communication device 180, the cellular base station 102, the WiMAX base station 103, broadband connections 202*a* and 202*b*, cellular connections 207*a*-207*c*, and WiMAX connection 209.

The content and/or service provider 248 may comprise suitable logic, circuitry, and/or code that may be operable to generate a datastream for communication over a broadband network. For example, the content and/or service provider 248 may output multimedia content such as an MPEG stream.

The femtocell management entity 260 may comprise suitable logic, circuitry, and/or code that may be operable to manage operation of the femtocells 150*a* and 150*b*. The femtocell management entity 260 may exchange messages with the femtocells 150*a* and 150*b* to coordinate, for example, CDMA codes associated with each femtocell, frequencies each femtocell may transmit on, power levels each femtocell may transmit at, and timeslots each femtocell may transmit during. Accordingly, the femtocell management entity 260 may enable coordination of which portions of a datastream may be broadcast and/or multicast by the femtocell 150*a* and which portions of the datastream may be broadcast and/or multicast by the femtocell 150*b*. In an exemplary embodiment of the invention, the femtocell management entity 260 may be operable to determine excess or available bandwidth in each of the femtocells 150*a* and 150*b* and may be operable to apportion the datastream accordingly.

The femtocells 150*a* and 150*b* may be similar to or the same as the femtocell 150 described with respect to FIG. 1B. The femtocells 150*a* and 150*b* may each be operable to process a portion of the datastreams and broadcast and/or multicast a portion of the datastream utilizing one or more cellular communication protocols.

The cellular enabled communication device 180 may be similar to or the same as the cellular enabled communication device 180 described with respect to FIG. 1C. The cellular enabled communication device 180 may be operable to receive a portion of a datastream from two or more of the femtocells 150*a* and 150*b*, the cellular base station, and the WiMAX base station combine the received portions, and utilize the datastream to, for example, effectuate operation of the femtocell or present multimedia to a user.

The broadband network 230 may comprise, for example, a satellite network, cable network, DVB network, the Internet or other IP based network, or similar local or wide area networks, which are capable of conveying data which may comprise multimedia.

In operation, the femtocells 150*a* and 150*b*, the cellular base station 102, and the WiMAX base station 103 may be located within range of the cellular enabled communication device 180. For example, the femtocells 150*a* and 150*b* may be installed in the same building or in close proximity out of doors. Similarly, the cellular base station 102 and the WiMAX base station 103 may be collocated. Two or more of the femtocells 150*a* and 150*b*, the cellular base station 102, and the WiMAX base station 103 may be operable to communicate simultaneously or seemingly simultaneously as in the case of TDM, to the cellular enabled communication device 180 via the cellular connections 207*a*, 207*b*, 207*c*, and WiMAX connection 209, respectively. Because multiple connections are utilized for transmitting the datastream, the bandwidth of the datastream may be greater than could be supported by a single cellular connection. In various embodiments of the invention, the cellular connections 207*a*, 207*b*, and 207*c* may utilize different frequencies, CMDA codes, and/or TDMA timeslots. Furthermore, the frequency, codes, and/or timeslots utilized by each of the femtocells 150*a* and 150*b* may be coordinated via the femtocell management entity 260.

Furthermore, one or more of the femtocell 150*a*, the femtocell 150*b*, the content and/or service provider 248, the cellular base station 102, the WiMAX base station 103, and the cellular enabled communication device 180 may be operable to coordinate transmission of the various portions of the datastream, such that the datastream may be properly and timely reassembled and bit or packet error rates are below an acceptable threshold. In this regard, the femtocells 150*a* and 150*b*, the content and/or service provider 248, and the mobile cellular device 180 may each be, for example, synchronized, to a clock maintained by a GNSS or via synchronization or timing information distributed through a broadband network to which the femtocell 150 is communicatively coupled. The femtocells 150*a* and 150*b*, the cellular base station 102, and/or the WiMax base station 103, which are operable to communicate different portions of the datastream, may each be synchronized so as to coordinate communication of the different portions of the datastream to the mobile cellular enabled communication device 180. The mobile cellular enabled communication device 180 may also be synchronized with the femtocells 150a and 150b, the cellular base stations 102, and/or the WiMax base stations 103 to coordinate receiving of the different portions of the datastream.

In various exemplary embodiments of the invention, a user interface of the mobile cellular enabled communication device 180 may be utilized to select which of the femtocells 150a and 150b, the WiMAX base station 103, and the cellular base station 102 that it may have a desire to receive the content from. Such a selection may be based on, for example, bandwidth availability, bandwidth cost, content cost, available power or battery level of the mobile cellular enabled communication device, and/or time-of-day at which the content is desired.

Figure 3A:
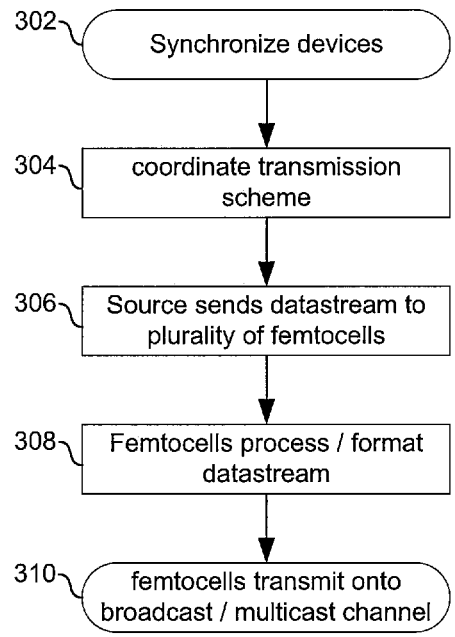
FIG. 3A illustrates exemplary steps for broadcasting and/or multicasting a data stream via a plurality of femtocells, in accordance with an embodiment of the invention.

FIG. 3A illustrates exemplary steps for broadcasting and/or multicasting a data stream via a plurality of femtocells, in accordance with an embodiment of the invention. Referring to FIG. 3A, the exemplary steps may begin with step 302 when a plurality of femtocells, a content source, and one or more cellular enabled communication devices may be synchronized. For example, synchronization may be achieved via the received GNSS signals or via timing or synchronization provided via a backbone network connection to a femtocell. Subsequent to step 302, the exemplary steps may advance to step 304.

In step 304, a plan for broadcasting a datastream via a portion of femtocells may be coordinated. In this regard, messages may be exchanged between a femtocell management entity and the plurality of femtocells to coordinate frequency, codes, and/or timeslots which may be utilized by each of the femtocells for transmitting portions of the datastream. In various exemplary embodiments of the invention, each femtocell may have the same amount of bandwidth available for broadcasting the datastream and the datastream may be evenly apportioned between the femtocells. For example, two femtocells may each transmit half of a datastream where the first femtocell may transmit every other packet of the datastream beginning with the first packet of the datastream and the second femtocell may transmit every other packet beginning with the second packet of the datastream. Subsequent to step 304, the exemplary steps may advance to step 306.

In step 306, the source of the datastream may begin transmitting the datastream to the plurality of femtocells. In some embodiments of the invention, the entire datastream may be transmitted to each of the plurality of femtocells. In other embodiments of the invention, portions of the datastream may be transmitted to the femtocells based on the apportioning of the datastream determined in step 304. Subsequent to step 306, the exemplary steps may advance to step 308.

In step 308, the femtocells may process the datastream for broadcast and/or multicast to one or more cellular enabled communication devices. In various embodiments of the invention, the femtocells may transcode or format the datastream to make it suitable for the cellular enabled communication device(s). For example, for a multimedia datastream the resolution, frame rate, color depth, or other characteristics of the content may be reduced to accommodate limited multimedia processing capabilities of a cellular enabled communication device. Subsequent to step 308, the exemplary steps may advance to step 310.

In step 310 each of the femtocells may begin transmitting the datastream onto a cellular broadcast and/or multicast channel, as determined in step 304.

Figure 3B:
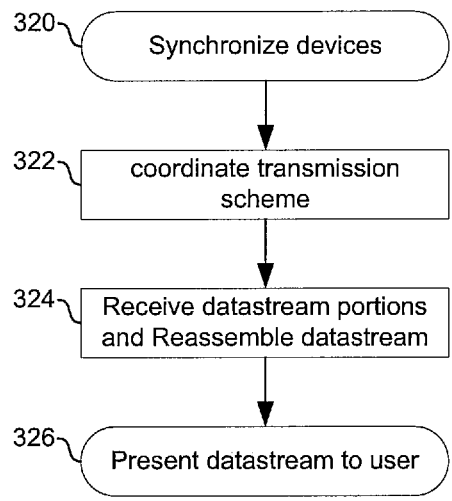
FIG. 3B illustrates exemplary steps for receiving, in a cellular enabled communication device, portions of a datastream from each of a plurality of femtocells, in accordance with an embodiment of the invention.

FIG. 3B illustrates exemplary steps for receiving, in a cellular enabled communication device, portions of a datastream from each of a plurality of femtocells, in accordance with an embodiment of the invention. Referring to FIG. 3B, the exemplary steps may begin with step 320 when a plurality of femtocells, a content source, and one or more cellular enabled communication devices may be synchronized. For example, synchronization may be achieved via received GNSS signals. Subsequent to step 320, the exemplary steps may advance to step 322.

In step 322, a plan for broadcasting a datastream via a portion of femtocells may be coordinated. In this regard, messages may be exchanged between a femtocell management entity and the plurality of femtocells to coordinate, frequencies, codes, and/or timeslots in which each of the femtocells may transmit portions of the datastream. One or more of the femtocells may communicate the determined plan to the one or more cellular enabled communication devices such that the devices may be prepared or configured to receive the datastream. Subsequent to step 322, the exemplary steps may advance to step 324.

In step 324, the cellular enabled communication device may begin receiving the portions of the datastream and may reassemble or reconstruct the datastream. In various exemplary embodiments of the invention, packet identifiers or timestamps inserted into the datastream by the femtocells may be utilized by the cellular enabled communication device to reconstruct the datastream. For example, portions of the datastream received that are out-of-order may be re-ordered based on the timestamps and/or packet identifiers such as frame sequence numbers. Subsequent to step 324, the exemplary steps may advance to step 326.

In step 326, the cellular enabled communication device may process the received datastream. In some exemplary embodiments of the invention, the datastream may comprise data or instructions utilized by one or more applications running on the cellular enabled communication device. In this manner the datastream may effectuate operation of the cellular enabled communication device. In other exemplary embodiments of the invention, the datastream may comprise multimedia content and the cellular enabled communication device may process the datastream to present the content to a user.

Figure 3C:
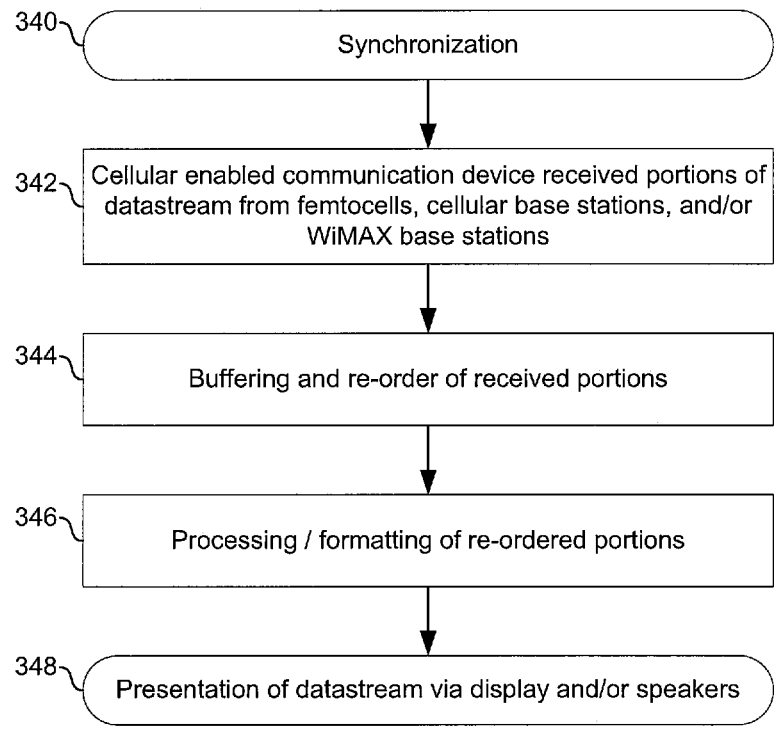
FIG. 3C illustrates exemplary steps for receiving portions of a datastream in a cellular enabled communication device from a combination of femtocells, cellular base stations, and/or WiMAX base stations, in accordance with an embodiment of the invention.

FIG. 3C illustrates exemplary steps for receiving portions of a datastream in a cellular enabled communication device from a combination of femtocells, cellular base stations, and/or WiMAX base stations, in accordance with an embodiment of the invention. Referring to FIG. 3C, the exemplary steps may begin with step 340 when a cellular enabled communication device may be synchronized with one or more femtocells, cellular base stations, and/or WiMAX base stations. Subsequent to step 340, the exemplary steps may advance to step 342.

In step 342, the cellular enabled communication device may begin receiving portions of a datastream from two or more of the devices with which it was synchronized in step 340. Subsequent to step 342, the exemplary steps may advance to step 344.

In step 344, the cellular enabled communication device may buffer and re-order the received portions of the datastream. In this regard, the portions may be reordered based on information contained in the packets of the datastream and based on the synchronization of the cellular enabled communication device and the sources of the received portions of the datastream. Subsequent to step 344, the exemplary steps may advance to step 346.

In step 346, the cellular enabled communication device may process the received datastream for presentation to a user of the cellular enabled communication device. In this regard, the cellular enabled communication device may, for example, decode, compress, decompress, transcode, and/or format the received datastream. Subsequent to step 346, the exemplary steps may advance to step 348.

In step 348, the cellular enabled communication device may present the datastream to a user. In this regard, visual content may be presented via a display of the cellular enabled communication device and audio content may be output via a speaker or headphone jack of the cellular enabled communication device.

Exemplary aspects of a method and system for multicasting or broadcasting via plurality of femtocells and a single cellular enabled communication device are provided. In an exemplary embodiment of the invention, a cellular enabled communication device 180 (FIG. 2) may receive portions of a datastream from femtocells 150a and 150b (FIG. 2), reconstruct the received portions of the datastream, and process the reconstructed received portions of the datastream for presentation to a user of the cellular enabled communication device 180. The cellular enabled communication device 180 and the femtocells 150a and 150b may be synchronized via, for example, received signals from a global navigation satellite system. The received portions may be buffered in the cellular enabled communication device. The buffered received portions of the datastream that are out-of-order may be reordered. The reordering may be done in a manner that reduces latency for latency sensitive traffic or information. In this regard, the handling and/or processing of the latency sensitive traffic or information by the cellular enabled communication device 180, the femtocells 150a and 150b, the WiMax base station 130, and/or the cellular base station 102, may be prioritized. Portions of the datastream may be associated with a plurality of CDMA channel access codes. Portions of the datastream may be received via a plurality of cellular frequencies. Portions of the datastream may be received during a plurality of TDMA timeslots. Portions of the datastream may be received from a cellular base station. Portions of the datastream may be received from a WiMAX base station 130.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for high reliability delivery of content to a plurality of users via a plurality of femtocells.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving, in a cellular enabled communication device, synchronization information to synchronize said cellular enabled communication device with a plurality of femtocells;
receiving, in the cellular enabled communication device, portions of a datastream from the plurality of femtocells;
reconstructing said datastream from said received portions of said datastream based on said synchronization information, wherein said reconstructing of said datastream includes reordering at least one of said received portions that is temporally out of order with respect to at least one other of said received portions; and
processing said reconstructed datastream for presentation by said cellular enabled communication device.

2. The method according to claim 1, wherein receiving said synchronization information comprises receiving signals from a global navigation satellite system, said signals being utilized to synchronize said cellular enabled communication device with said plurality of femtocells.

3. The method according to claim 1, further comprising buffering said received portions of said datastream.

4. The method according to claim 1, receiving wherein said received portions of said datastream are associated with multiple Code Division Multiple Access (CDMA) channel access codes.

5. The method according to claim 1, wherein said received portions of said datastream are received during multiple Time Division Multiple Access (TDMA) timeslots.

6. The method according to claim 1, wherein said received portions of said datastream are received on multiple cellular frequencies.

7. The method according to claim 1, wherein said received portions of said datastream are received from a cellular base station.

8. The method according to claim 1, wherein said received portions of said datastream are received from a Worldwide Interoperability for Microwave Access (WiMAX) base station.

9. The method according to claim 1, wherein said reordering is based on timestamps inserted into said datastream by said plurality of femtocells.

10. The method according to claim 1, wherein said reordering is based on frame sequence numbers inserted into said datastream by said plurality of femtocells.

11. The method according to claim 1, further comprising:
receiving, by said cellular enabled communication device, a coordinated management plan from one or more femtocells of said plurality of femtocells, wherein said portions of said datastream are received from said plurality of femtocells based on said coordinated management plan.

12. A system for communication, the system comprising:
one or more circuits for use in a cellular enabled communication device, said one or more circuits being configured to:
receive synchronization information to synchronize said cellular enabled communication device with a plurality of femtocells;
receive portions of a datastream from the plurality of femtocells;
reconstruct said datastream from said received portions of said datastream based on said synchronization information, wherein said reconstruction includes reordering at least one of said received portions that is temporally out of order with respect to at least one other of said received portions; and
process said reconstructed datastream for presentation to a user of said cellular enabled communication device.

13. The system according to claim 12, wherein said synchronization information comprises signals from a global navigation satellite system, said signals being utilized to synchronize said cellular enabled communication device with said plurality of femtocells.

14. The system according to claim 12, wherein said one or more circuits are further configured to buffer said received portions of said datastream.

15. The system according to claim 12, wherein said one or more circuits are configured to receive portions of said datastream that are associated with multiple Code Division Multiple Access (CDMA) channel access codes.

16. The system according to claim 12, wherein said one or more circuits are configured to receive portions of said datastream during multiple Time Division Multiple Access (TDMA) timeslots.

17. The system according to claim 12, wherein said one or more circuits are configured to receive portions of said datastream on multiple cellular frequencies.

18. The system according to claim 12, wherein said one or more circuits are configured to receive portions of said datastream from a cellular base station.

19. The system according to claim 12, wherein said one or more circuits are configured to receive portions of said datastream from a Worldwide Interoperability for Microwave Access (WiMAX) base station.

20. The system according to claim 12, wherein said one or more circuits are configured to receive a coordinated management plan from one or more femtocells of said plurality of femtocells, wherein said portions of said datastream are received from said plurality of femtocells based on said coordinated management plan.

* * * * *

UNITED STATES PATENT AND TRADEMARK OFFICE
CERTIFICATE OF CORRECTION

PATENT NO.        : 8,830,951 B2  
APPLICATION NO.   : 12/391009  
DATED             : September 9, 2014  
INVENTOR(S)       : Jeyhan Karaoguz Page 1 of 1

It is certified that error appears in the above-identified patent and that said Letters Patent is hereby corrected as shown below:

In the Claims

Column 14, line 38, please replace "receiving wherein said received portions" with --wherein said received portions--.

Signed and Sealed this  
Tenth Day of February, 2015

Michelle K. Lee  
*Deputy Director of the United States Patent and Trademark Office*